June 3, 1952

W. F. KRUEGER 2,599,112

APPARATUS FOR DETERMINING THE TIME OF DESCENT
OF INSTRUMENTS WITHIN BOREHOLES

Filed Oct. 7, 1947

INVENTOR.
William F. Krueger
BY
ATTORNEYS

Patented June 3, 1952

2,599,112

UNITED STATES PATENT OFFICE 2,599,112

APPARATUS FOR DETERMINING THE TIME OF DESCENT OF INSTRUMENTS WITHIN BOREHOLES

William F. Krueger, Houston, Tex., assignor to Sperry-Sun Well Surveying Company, Philadelphia, Pa., a corporation of Delaware Application October 7, 1947, Serial No. 778,376

3 Claims. (Cl. 346—7)

This invention relates to apparatus for timing the descent of instruments such as well surveying instruments within bore holes, particularly when the descent is effected in go-devil fashion, i. e., by permitting the instrument to fall freely through the mud within a drill stem.

A common method of using well surveying instruments involves the dropping of the instruments through a drill stem containing mud prior to the removal of the drill stem for the purpose of replacing a bit or for some other reason, by virtue of which removal the instrument, having attained a position adjacent to the bit, is recovered. When instruments are so used they are provided with timing means for the purpose of controlling the making of a record or for the purpose of rendering the recording means in the instrument inactive so as to prevent the making of undesired duplicate records. Certain of these instruments, as particularly exemplified by the photographic type, are provided with clockwork mechanisms, the function of which is to delay the making of a record by exposure of a photographic film until such time as the instrument has reached a position of rest at the lower end of the drill stem. The operator in such case in preparing the instrument for use must estimate the time which will elapse between the enclosure of the instrument in its protective casing and the time when it will have reached a position of rest so that the parts are in condition for the making of a proper record without blurring. In another type of instrument the recording apparatus is continuously in operative condition during the descent of the instrument and for some period thereafter. In this latter type of instrument the recording action is a slow one so that the vibration of the instrument on its way down the bore hole and during the previous handling at the surface will not make a record which would be confused with or mar the desired record. A record in such instrument will only be made in identifiable fashion after the instrument reaches the lower end of the drill stem and remains at rest for a substantial period. In the case of such instruments, however, it is desirable to provide means for interrupting the activity of the recording devices after a period of sufficient duration to permit the instrument to make the desired record so that undesired duplicate records will not be made during a cessation of movement occurring in the period of removal of the instrument. The removal of a drill stem from a deep hole is a time consuming operation and generally cannot be carried out continuously so that one or more periods of rest may occur during the removal, within which periods a record would be made if the recording means continued active.

In both of these cases it will be evident that the operator should make a good estimate of the time which will elapse between the setting of the instrument and the time when it reaches the lower end of the drill stem. Heretofore, the operator has been required to guess this time and set the instrument accordingly. In the case of an instrument provided with a time control which determines the making of a record it has been necessary to make a time estimate substantially in excess of the expected time of descent so that there will be assurance that the instrument will be at rest at the time the record is made. The result is that the making of a survey takes an undue amount of time, the instrument probably being at rest long before the end of the period of a safe estimate. In the case of the second mentioned type of instrument safety again requires that the instrument should be kept in motion following the making of a record for a sufficient time to insure that the device rendering the recording means inoperative will have performed its result, its setting being necessarily such that it will not render the recording means inoperative before a record is made.

As will be evident in both cases a more accurate knowledge of the time of descent of the instrument will be of substantial value in enabling the operator to shorten the time necessary for a survey as well as permitting him to undertake various operations either before or after the recording action with assurance that the making of a record will not be subject to interference.

The time required for descent of an instrument cannot be determined with any degree of accuracy from any theoretical considerations. The depth through which the instrument must move, the density of the mud, the rate of mud flow if circulation is continued during the descent of the instrument, the condition of the drill stem and other matters, all enter as factors in the time of descent of the instrument.

The value of time in drilling is quite high and a delay of drilling, for example, of five minutes through an overestimate of the time required to make a survey, may well involve a loss of fifty dollars. On the other hand, an underestimate which may result in failure to secure a record may, by requiring repetition of the survey, cost in the neighborhood of several hundred dollars. The considerable value of knowing quite precisely the time of descent may thus be easily appreciated.

In the application of Gottdank L. Kothny,

Serial Number 653,684, filed March 11, 1946, there is disclosed a means for securing a record of the time of descent of an instrument to its position to rest. Prior to the time of first use of an instrument in a bore hole the use of such apparatus will give information as to the time of descent which may then be used thereafter for a better estimate of the time of descent for subsequent surveys in the same hole in view of the generally warranted assumption that the density of the mud and other conditions governing descent will be nearly the same, and that the only difference in time of descent will arise as a result of the different depths at which the subsequent surveys were taken.

It is the general object of the present invention to improve the apparatus of said Kothny application by providing a simple type of time recording apparatus which may be used during every run of a well surveying instrument. If so used the operator will have after each run an accurate indication or record of the time required for descent of the apparatus. This information can then be used for the next survey, taking into account the fact that a longer time of descent may be involved due to the greater depth at which the survey is made. In any case, the operator may insure that sufficient time is allowed for the making of a record without the allowance of excess time with the monetary loss which it would involve.

The attainment of this object, as well as other objects of the invention relating to details of construction and operation will become apparent from the following description read in conjunction with the accompanying drawing in which.

Figure 1:
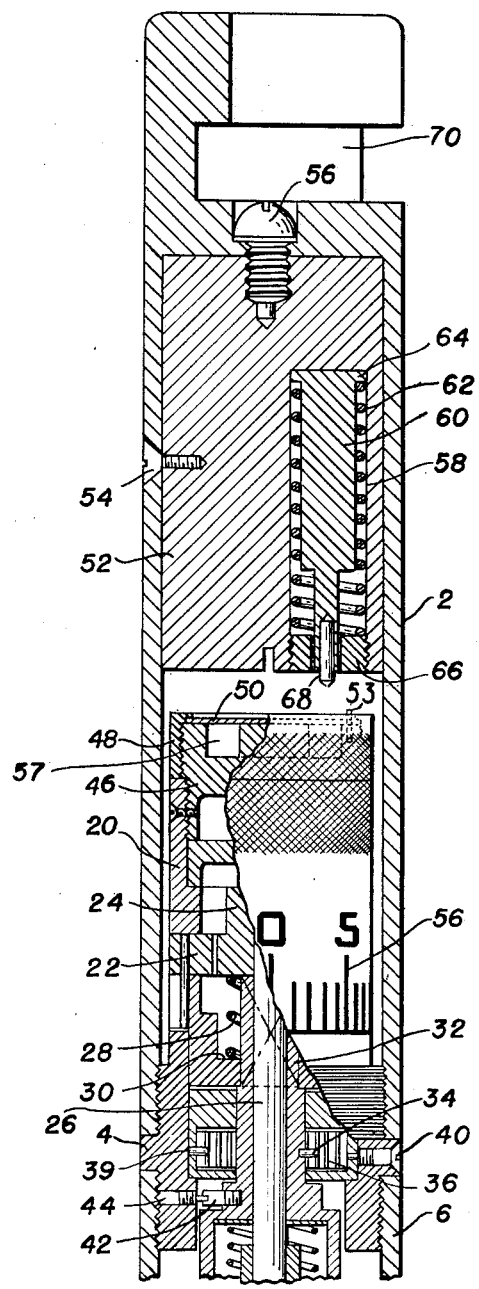
Figure 1 is a vertical section through the upper portion of a surveying instrument including the time recording means.

In the embodiment of the invention illustrated there is used as an example of the type of well surveying instrument to which the invention may be applied that illustrated in the application of Roland Ring, Serial Number 629,052, filed November 16, 1945, now Patent No. 2,559,373, July 3, 1951, the upper portion of this instrument being illustrated. While the instrument of this Ring application demonstrates the use of this invention it will be evident that the invention is applicable to the timing of descent of surveying instruments in general.

The Ring application is particularly referred to since it illustrates a clockwork mechanism controlled by an escapement and which slowly rotates a rotary knob about a longitudinal axis, which knob may carry the record disc in the present apparatus. The cap member which encloses the upper end of the clockwork mechanism in said Ring application is replaced in the present case with a longer cap member 2 which houses the time recording apparatus. This is threaded to a coupling member 4 which is, in turn, threaded to the lower portion of the instrument housing 6. The complete assembly is hung within a protective casing in the usual fashion by the securing of a T slot 70 formed in the cap 2 with a hanger bolt located within the protective casing.

The time setting knob 20 similar to that illustrated in the Ring application is knurled on its exterior surface for manipulation by the operator and is provided with a tooth 22, arranged to engage between teeth of a pinion 24 carried by the upper end of a shaft 26 which, as illustrated in said Ring application, is controlled through bevel gears 27 by a clockwork escapement mechanism indicated at 29 and provided with an escapement at 31. This surmounts an assembly indicated generally at 33 located above a battery housing, a pendulum, and an inclination record disc all of the type described in said Ring application. For purposes of the present application it will be unnecessary to do more than indicate at 33 this entire inclination recording apparatus. It will, of course, be evident that the mechanism for determining the time which will be described in greater detail thereafter may be associated with any other type of recording apparatus, recording either inclination alone or direction as well as inclination.

A spring 28 reacts between the pinion 24 and an inwardly directed shoulder 30 of the setting knob 20. Surrounding the shaft 26 is a sleeve 32 which has a square portion received in a square hole in the lower end of the knob 20 so that the knob and this sleeve are constrained to rotate together while, nevertheless, the knob may be moved axially relative to the sleeve for the purpose of disengaging the tooth 22 from the pinion 24. A pin 34 carried by the sleeve is connected to one end of spring 36, the other end of which is secured to a pin 39 carried by the coupling 4. In order to limit rotation of the sleeve 32 it is provided with a pin 42 arranged to cooperate with a stop pin 44 carried by the coupling 4.

The clockwork mechanism so far described will be recognized as identical with that illustrated in the Ring application. In its operation the knob 20 is pulled outwardly to disengage the tooth 22 from the pinion 24, and is then rotated to a desired extent to produce a time delay, this being indicated by markings 56 in conjunction with an index marking on the coupling 4, and the knob is then released to engage the tooth 22 between teeth of the pinion 24. The result is to wind the spring 36 which is under preliminary tension with the final result that after release the mechanism runs down at a speed controlled by the escapement mechanism, the knob 20 turning at a slow rate until the pin 42 engages the stop 44. The result of this, as more fully described in the Ring application, is to control an electrical circuit suitable to the particular surveying instrument involved.

Figure 3:
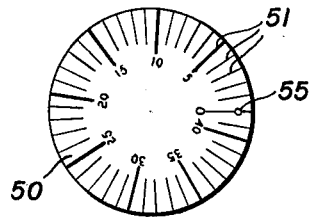
Figure 3 is a plan view of a record disc used in the apparatus.
Figure 2:
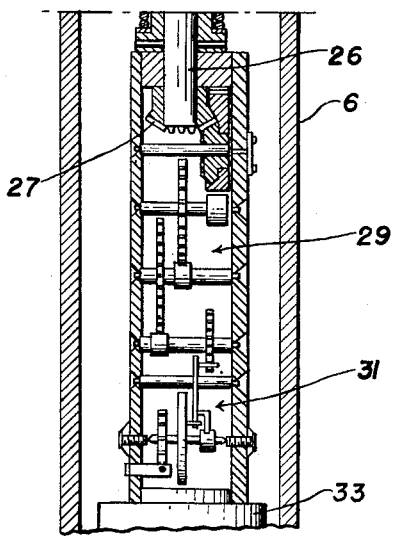
Figure 2 is a vertical section constituting a lower continuation of Figure 1.

In accordance with the present invention there is threaded into the upper end of the knob 20 a member 46 which is externally threaded to receive a clamping member 48 provided with an inwardly directed flange to clamp a cardboard time record disc 50 against the upper surface of the member 46. This disc is illustrated in Figure 3 as carrying time markings 51 at its periphery and as provided with a hole 55 arranged to be located over a pin 53 carried by the member 46 to align it initially in predetermined position relative to the time markings 56. An annular groove 57 in the member 46 underlies the annular portion of the disc 50 which is marked in the fashion described hereafter.

Within the upper portion of the cap member 2 there is secured by screws 54 and 56 a block 52 which is provided with an eccentric bore 58 arranged to receive a plunger 60 which is normally held in an upper position by a spring 62 engaging its flange 64 and resting upon a plug 66 threaded into the bore 58. A small diameter extension of the member 60 passes through an opening in the plug 66 and carries a hardened pointed pin 68 which is in line with the groove 57 in the member 46.

In operation of the described well surveying instrument a cardboard disc 50 is located in position on the member 46 with its opening 55 embracing the pin 53 and is clamped thereon by means of the ring 48. The time required for descent is estimated, for example, from a previous record as indicated above and to this are added the times estimated for assembly of the apparatus and introduction into the upper end of the drill stem and for the making of a record after it reaches its position of rest. The knob 29 is pulled outwardly to disengage the tooth 22 from the pinion 24 and it is then rotated to an extent corresponding to the estimated time delay. The cap 2 is then placed in position and the instrument inserted in its protective casing which is properly closed.

Just prior to insertion of the instrument into the upper end of the drill stem it may be struck upon the derrick floor with the result that by inertia the member 60 is driven downwardly against the spring 62 to produce a mark on the disc 50 by the impact of the pin 68.

The instrument is then dropped in go-devil fashion and after the proper estimated time has elapsed the drilling may be resumed and the instrument then brought to the surface when the drill stem is withdrawn either to change the bit or for other purposes. During the estimated time of descent circulation may be resumed and the drill stem rotated. If the instrument is of the pendulum type described in the Ring application no record will be made during the descent because of continuous vibration of the pendulum. During its passage through the drill stem the instrument may be subjected to shocks and consequently the pin 68 may be driven by inertia against the disc 50 to provide markings. However, a final mark will be produced, generally deeper than the others, when the instrument lands on its catcher at the final bottom position.

When the instrument is opened there will be found on the disc 50 at least two marks, one of them corresponding to the mark made at the surface before lowering and the other corresponding to the attainment of its final bottom position. Between these there may be other marks which, however, can be disregarded. The difference in spacing between the first and last marks gives the time between the making of the first mark and the attainment of the final position by the instrument. Furthermore, as is desirable, the pin 68 is in alignment with the zero marking on the disc 50. When the clockwork mechanism is run down there can be determined the interval between the time the instrument came to rest and the final position of the clockwork mechanism corresponding to opening of the circuit through the recording mechanism. Complete information is thus secured from which an accurate estimate of the time required for operation on the next run may be obtained. As will be evident there can thus be saved very considerable time during which the drill stem would have to be out of operation. Furthermore, there can be assured the making of a record by avoidance of too low estimates of time required.

While desirably the time determining apparatus is used in conjunction with a surveying instrument upon each operation thereof it may be used separately, a clockwork mechanism being provided without a surveying instrument. The simplicity of operation and of construction is such that there can be adopted as a regular procedure the determining of time of descent upon each operation of the surveying instrument.

It will be evident that various changes may be made in details of the construction and operation without departing from the invention as defined in the following claims.

What I claim and desire to protect by Letters Patent is:

1. Apparatus adapted to be dropped go-devil fashion within a bore hole comprising timing means, well surveying apparatus controlled by said timing means after a predetermined time of operation of said timing means, a record member driven by said timing means, and a marking element subject to vertical inertial movement constructed and arranged to engage and mark said record member when vertical movement of the apparatus is suddenly arrested, said marking element recording on said record member a record of the time of descent of the apparatus within the bore hole and a record of the time interval after descent of the apparatus and before the time of control of the surveying instrument by the timing means.

2. Apparatus adapted to be dropped go-devil fashion within a bore hole comprising a clockwork timer, well surveying apparatus controlled by said timer after a predetermined time of operation of said timer, a record member driven by said timer, and a marking element subject to vertical inertial movement constructed and arranged to engage and mark the record member when the movement of the apparatus is suddenly arrested, said marking element recording on said record member a record of the time of descent of the apparatus within the bore hole and a record of the time interval after the descent of the apparatus and before the time of control of the surveying instrument by the timer.

3. Apparatus adapted to be dropped go-devil fashion within a bore hole comprising a clockwork timer operative for a predetermined time interval, well surveying apparatus controlled by said timer after the predetermined time of operation of said timer, a record member driven by said timer and a marking element subject to vertical inertial movement constructed and arranged to engage and mark the record member when movement of the apparatus is suddenly arrested, said marking element recording on said record member a record of the time of descent of the apparatus within the bore hole and a record of the time interval after descent of the apparatus and before the time of control of the surveying instrument by the timer.

WILLIAM F. KRUEGER.

REFERENCES CITED

The following references are of record in the file of this patent:

UNITED STATES PATENTS

| Number | Name | Date |
|---|---|---|
| 304,301 | Mesmacker | Sept. 2, 1884 |
| 959,912 | Bell | May 30, 1910 |
| 963,055 | Miller | July 5, 1910 |
| 1,078,867 | McGraw | Nov. 18, 1913 |
| 1,493,067 | Cool | May 6, 1924 |
| 1,519,473 | Zahm | Dec. 16, 1924 |
| 1,577,160 | Baskerville | Mar. 16, 1926 |
| 2,197,571 | Millington et al. | Apr. 16, 1940 |
| 2,317,386 | Kothny | Apr. 27, 1943 |
| 2,449,704 | Jones | Sept. 21, 1948 |